United States Patent Office 3,609,985
Patented Oct. 5, 1971

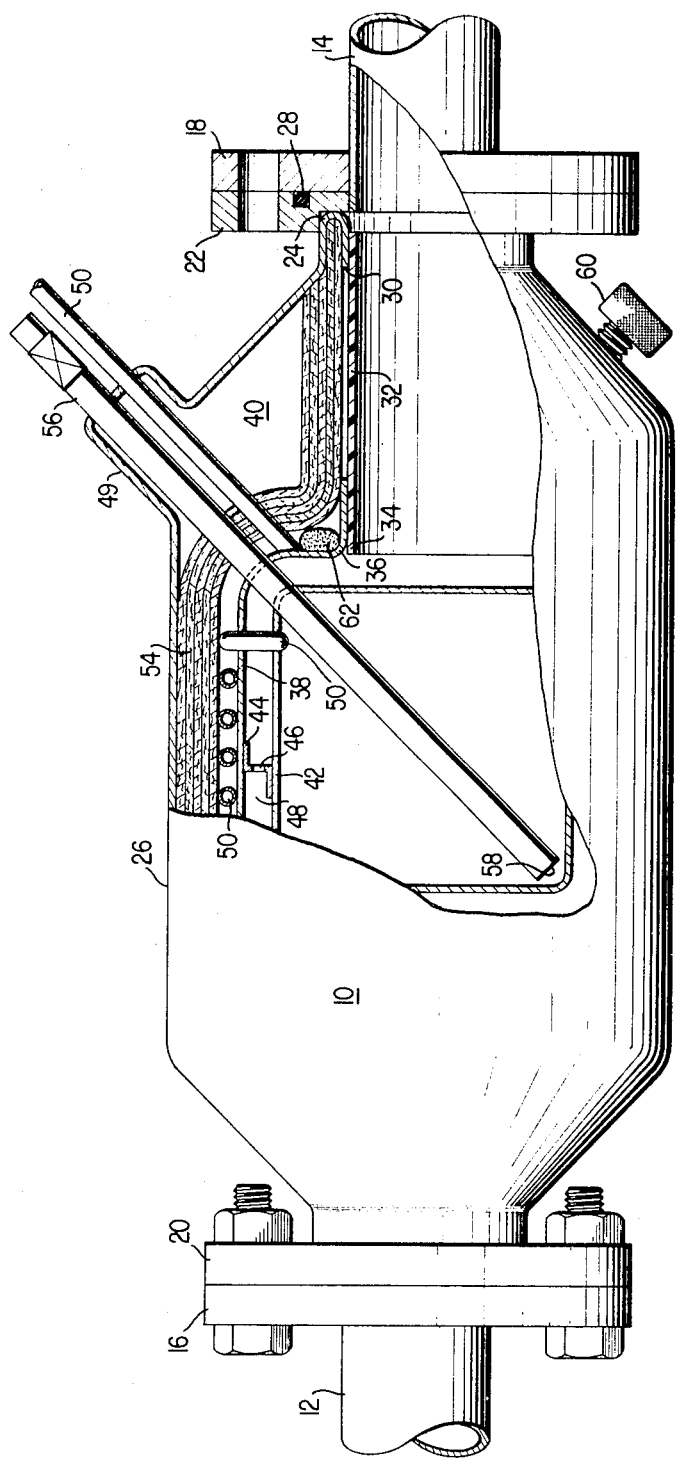

3,609,985
VACUUM COLD TRAP
James R. Dehaan, Boulder, Colo., assignor to
Cryogenic Engineering Co., Denver, Colo.
Filed Dec. 5, 1968, Ser. No. 781,371
Int. Cl. B01d 5/00
U.S. Cl. 62—55.5
16 Claims

ABSTRACT OF THE DISCLOSURE

A cold trap having a cryogen reservoir is located in a vacuum line between a pump and the evacuated system, so that gases from the system are drawn past the reservoir on the way to the pump. A fill tube enters the reservoir at a 45° angle to the vacuum line.

The reservoir is surrounded by a separately evacuated vacuum jacket which has a vent tube from the reservoir coiled about the inner wall thereof and includes a laminated bulk insulation. In addition, the cold trap's inlet and fill tubes are comprised of low conductive material to conserve the trap's cold and maintain cold trapping surfaces.

Oil diffusion pumps are frequently used to evacuate high vacuum systems. In such cases, oil from the pump has a tendency to migrate into the evacuated system so as to both contaminate the system and prevent it from reaching the desired vacuum. In addition, particularly in systems having poorer vacuums, water vapor from the system has a tendency to find its way into the pump's oil supply. Hence, cold traps are often located between the pump and the system to prevent both the migration of the pump's oil into the vacuum chamber, and the accumulation of water in the pump's oil. In this respect, the trap is arranged so as to have a cold surface in the gas flow path between the vacuum chamber and the pump. In this manner, the gas molecules that are drawn out of the system merely bounce off the cold surface, but the heavy oil and water molecules freeze and become "trapped" on the cold surface. One such cold trap is described in U.S. Pat. 3,304,731, which issued on Feb. 21, 1967 to Bills et al.

One common type of cold trap employs a container for a cryogen such as liquid nitrogen. The container is exposed to the surrounding vacuum space so that the surface area which is cooled by the boiling cryogenic fluid will be contacted by the oil and water molecules. These cold traps maintain their desired low temperatures for typical periods of about 8 to 20 hours with one filling of liquid nitrogen for example. Consequently, in manufacturing or process control applications where cold trap temperatures are required to be continuously maintained, it is necessary to refill the liquid containers every 8 to 20 hours or so. In these situations, therefore, it is necessary to assign personnel to monitor and fill such cold traps during weekends or other inconvenient times when the manufacturing facility is normally closed down. It is an object of this invention, therefore to provide an improved cold trap which maintains its desired low temperature for long periods of time such as 5 to 10 days or so.

One previous solution to the necessity of filling the cryogen containers of cold traps at relatively frequent intervals has been to provide automatic filling systems for the cold trap reservoirs. This has resulted in both elaborate and expensive equipment as well as the necessity for providing separate storage facilities near the cold trap for the cryogen with which the cold trap reservoir is filled. It is another object of this invention, therefore, to eliminate the need for such costly and cumbersome equipment.

The reservoirs of presently available cold traps are sometimes mounted in horizontally running conduits and other times mounted in vertically running conduits. Consequently, it has been customary to provide separately designed cold trap systems for horizontal and vertical applications. It is another object of this invention to provide a single cold trap that is suitable for use in either horizontal or vertical configurations.

Not only do the presently available types of cold traps require frequent filling of cryogen, but this frequent replenishment requires the use of large volumns of cryogen. Hence, it is another object of this invention to reduce the amount of cryogen that is required to be supplied to a cold trap over a given period of time.

Even when cold traps are used in the vacuum lines of cryogenic systems, some such traps still permit certain quantities of oil and other impurities from the vacuum pumps to "creep" into the system's vacuum lines. Consequently, it is still another object of this invention to provide an improved cold trap which still further inhibits such undesirable oil creep.

In accordance with the principles of the invention, a cryogenic fluid reservoir is located within a cold trap area of the trapped vacuum line and a fill tube is directed into the reservoir at a 45 degree angle to the direction of the vacuum line. In this manner, the reservoir, and therefore the line can be located either vertically or horizontally without modification. The reservoir is affixed in the trap area so that it serves as a cold baffle which all molecules must strike before passing through the trap. Hence, the impurities are condensed out, but the gas molecules are permitted to pass on toward the pump.

The trap area is exposed to the system's vacuum and surrounded by a common inner wall of a separately evacuated vacuum jacket. A boil-off vent tube from the reservoir is directed through the common inner wall of the vacuum jacket; coiled thereabout; and passed through the vacuum jacket's outer wall so as to vent the boil-off gas. In this manner, the refrigeration value of the boil-off gas is used to cool the vacuum jacket's inner wall prior to the gas being exhausted. The column within the jacket is filled with a bulk insulation to further assist in maintaining the vacuum jacket's inner wall at a low temperature. This combination of a vacuum-bulk insulated cold trap whose common wall is refrigerated by the reservoir's boil-off gases reduces heat flux to the cryogen reservoir and thus reduces fluid boil-off rate and also provides a cold wall around the trap area to further prevent oil creep.

In accordance with another aspect of the invention, the inlet and fill tubes to the cold trap area are comprised of low conductive material such as fiberglass reinforced epoxy. This permits still less cold to be transported away from the cold trap area so as to maintain the trap's common wall as cold as possible.

The foregoing and other objects, features, and advantages of the invention will be apparent from the more particular description of a preferred embodiment thereof as illustrated in the accompanying drawing. The drawing is not necessarily intended to be scale, but rather is presented so as to illustrate the principles of the invention in clear form.

In the drawing:

The figure is an elevational view, partially in section, of a cold trap which incorporates a preferred embodiment of the invention.

Referring now to the drawing, a cold trap assembly designated generally as 10 is connected between two pipes 12 and 14 of a vacuum system. The pipes are affixed to flanges 16 and 18 which are bolted or otherwise suitably fastened to corresponding cold trap flanges 20 and 22 each of which has a recess 24 cut into the inner face thereof. An outer wall 26 of the cold trap assembly is welded to the flanges 20 and 22 at the recesses 24; and the mating flanges such as 18 and 22 are sealed against leakage by some suitable means such as an O ring 28.

Each end of the outer wall 26 has an inner bent-over portion 30 abutting the circumference of a tube such as 32. These tubes are preferably comprised of a low thermal conductivity material such as fiberglass reinforced epoxy or stainless steel. The inner end 34 of each of the tubes 32 is abutted about its circumference by a flared portion 36 on an inner wall member 38 of the vacuum chamber 40.

A substantially closed container 42 serves as a reservoir for a cryogenic fluid such as liquid nitrogen which boils at about —320 degrees F. The container 42 is centrally suspended from the vacuum jacket's inner wall 38 by means of a support 44 structured to provide minimum impedance to gas flow through the thusly formed annular channel 48 between wall 38 and the outer wall 42 of the cryogen reservoir. In this respect, a plate 44 having apertures 46 has been found to be a suitable support, but if greater conductance is desired, the reservoir can be supported from the vacuum jacket's inner wall 38 by other means such as rods or wires.

As the reservoir tends to be warmed by the influx of heat by radiation, gas conduction and conduction through the supports, the liquid nitrogen boils off and passes out of the assembly through a vent tube 50. This vent tube leaves the reservoir at its upper right hand corner in the figure and is generally spirally wrapped about the vacuum jacket's inner wall before it passes out of the vacuum jacket at protuberance 49. In this manner, the refrigeration value of the reservoir's boil-off gases is given up to the vacuum jacket's inner wall rather than being passed to the atmosphere. Structures of this general type have previously been employed in Dewar vessels, one of which is more fully described in the U.S. Pat. 3,134,237.

The vacuum jacket also contains one or another of a variety of bulk insulation materials. One of the more satisfactory types of bulk insulation is comprised of laminated radiation barriers which are separated from each other by a suitable low conductive material. It is this type of bulk insulation 54 that is illustrated in the drawings and which is preferred. A multi-layer insulation of this type is described, for example, in an article by Dr. Richard H. Kropschot of the National Bureau of Standards. This article appears in the March 1961 issue of Cryogenics, volume 1, No. 3 and is entitled "Multiple Layered Insulation For Cryogenic Application."

The liquid nitrogen reservoir 42 is filled by means of a fill line 56 which enters the protuberance 49 in the upper right hand corner of the figure at an angle of 45 degrees to the axis of the reservoir 42 and terminates at 58. In this manner, the invention's cold trap assembly can be used in either a horizontal position as illustrated in the drawings, or a vertical position without requiring any modification of either the liquid nitrogen reservoir or its fill and vent lines. Hence, the structure just described fulfills one of the invention's objectives of providing a single structure which is suitable for use in connection with either horizontal or vertical applications.

The vacuum jacket 40 is evacuated by means of suitable pumping through a fitting 60 which can be of any conventional type. Similarly, an adsorbent getter receptical 62 is retained on the cold side of the evacuated space such as under the laminated insulation 54. This getter container is filled with a material such as charcoal or silica gel or molecular seives and functions to adsorb gases and maintain the jacket's vacuum after it has been evacuated through the fitting 60. It is also preferable for the vacuum space to include a selective hydrogen getter such as palladium or oxides of palladium or oxides of silver. These types of getters function to remove hydrogen from the evacuated space.

It should be appreciated by those skilled in the art that the low conductive material used for the tubes 32 serves to reduce the transfer of cold from the ends of the tubes near the reservoir to the ambient temperature ends. Similarly, it should be appreciated that the vacuum in the space 40 is separate from the trapped system's vacuum and, moreover, that the multilayer insulation 54 assists this separate vacuum chamber in maintaining the trap assembly's central portion at a low temperature for extended periods of time.

The spirally wound boil-off tube 50 also plays an important part in maintaining the central portion of the trap at a low temperature. That is the spiralled tube 50 forces the reservoir's boil-off gases to give up some of their refrigeration value to the vacuum jacket's inner wall. Consequently, all of the trap assembly's inner surfaces (mainly walls 38 and 42) are maintained at low temperature. This is in contrast to the prior art types of cold traps in which the surfaces corresponding to the outer surface of the annular channel are maintained at a temperature at or near ambient conditions. In this respect, tests of one embodiment of the invention have indicated that the temperature of the vacuum jacket's inner wall was maintained at about —181 degrees F. which is only about 139 degrees above the boiling point of the liquid nitrogen in the reservoir 42. Thus, all of the surfaces surrounding the annular channel 48 were effective in stopping the otherwise normal creep of oil toward the evacuated system.

The above noted tests on a preferred embodiment of the invention rather dramatically resulted in a more than 10 fold decrease in the rate of liquid nitrogen consumption over that of a conventional cold trap. In this respect, a conventional 2 inch cold trap was found to consume 0.534 liter of nitrogen per hour, but a 2 inch cold trap of the invention, consumed only 0.043 liter of liquid nitrogen per hour.

Moreover, the conventional cold trap had a holding time of 15 hours, while the test cold trap had a holding time of 140 hours. Consequently, the inventive structure's holding time was almost an order of magnitude greater than that of the conventional trap. This factor alone, therefore, permits the trap of the invention to go for long periods of time without filling so as to eliminate the need for either elaborate and expensive automatic filling mechanisms or the requirement that technicians be on hand during week-ends or other periods of manufacturing inactivity merely to monitor cold traps. And this is to say nothing of the inventive structure's ability to inhibit oil creep so as to reduce contamination of the associated systems with which the cold trap is employed. Of course, the structure's ability to be used in either horizontal or vertical applications also serves to increase its utility and desirability.

While the invention has been particularly shown and described with reference to preferred embodiments thereof, it will be understood by those skilled in the art that various changes in form and details may be made therein without departing from the spirit and scope of the invention. For example, although the invention's cold trap has been described in connection with liquid nitrogen; and although certain types of flange connections have been illustrated, it will be appreciated that the principles of the invention are just as applicable to other types of cryogenic fluids and flange connections.

The embodiments of the invention in which an exclusive property or privilege is claimed are defined as follows:

1. In a cold trap of the type in which gas molecules pass from an evacuated system through an entry side of said cold trap, over a reservoir of cryogenic fluid, and out an exit side of said trap, the combination comprising:
a double walled vacuum jacket substantially surrounding said reservoir and enclosing the area between the entry and exit portions of said cold trap; and
means adapting said vacuum jacket for evacuation by a means separate from said vacuum system.

2. Apparatus according to claim 1 including a bulk insulation in said vacuum jacket.

3. Apparatus according to claim 1 including:
means for directing cold boil-off gas from said reservoir into heat transfer relationship with the inner wall of said vacuum jacket so as to cool said inner wall and reduce the heat flux to said reservoir thereby reducing the boil-off rate of said cryogenic fluid.

4. Apparatus according to claim 3 including a bulk insulation in said vacuum jacket.

5. Apparatus according to claim 1 wherein the direction of flow of said gas molecules from said vacuum system through and out of said cold trap defines an axis of said cold trap and including:
a fill line extending into said reservoir at an angle of about 45° to said axis of said cold trap.

6. Apparatus according to claim 5 including:
means for directing cold boil-off gas from said reservoir into heat transfer relationship with the inner wall of said vacuum jacket so as to cool said inner wall and reduce the heat flux to said reservoir thereby reducing the boil-off rate of said cryogenic fluid.

7. Apparatus according to claim 6 including a bulk insulation in said vacuum jacket.

8. Apparatus according to claim 1 including a low thermal conductivity connecting means for connecting the inner wall of said vacuum jacket to said exit and entry sides of said cold trap.

9. Apparatus according to claim 8 including:
means for directing cold boil-off gas from said reservoir into heat transfer relationship with the inner wall of said vacuum jacket so as to cool said inner wall and reduce the heat-flux to said reservoir thereby reducing the boil-off rate of said cryogenic fluid.

10. Apparatus according to claim 8 including a bulk insulation in said vacuum jacket.

11. Apparatus according to claim 10 including:
means for directing cold boil-off gas from said reservoir into heat transfer relationship with the inner wall of said vacuum jacket so as to cool said inner wall and reduce the heat flux to said reservoir thereby reducing the boil-off rate of said cryogenic fluid.

12. A cold trap for selective use in either a horizontal or vertical orientation, said cold trap having an axis thereof defined by the direction of flow of gas molecules from an evacuated system through an entry side of said cold trap and out of an exit side of said cold trap, comprising:
a cryogen reservoir located in said cold trap along said axis, said reservoir being substantially closed except at the upper portion thereof whether said cold trap is in said vertical orientation or said horizontal orientation; and,
a fill line extending into said reservoir at an angle of about 45° to said axis and entering said reservoir at a point in said upper portion thereof whether said cold trap is in said vertical or said horizontal orientation;
whereby said cold trap is adapted for selected use in either a horizontal or a vertical orientation.

13. Apparatus according to claim 12 wherein said reservoir is surrounded by a wall and including:
a low thermal conductivity means between said wall and said exit and entry sides of said cold trap.

14. Apparatus according to claim 13 wherein said wall is connected to an outer second wall to form a vacuum jacket comprised of first and second walls substantially surrounding said reservoir and including:
means adapting said vacuum jacket for evacuation by a means separate from said vacuum system.

15. Apparatus according to claim 14 including a bulk insulation in said vacuum jacket.

16. Apparatus according to claim 13 including:
means for directing cold boil-off gas from said reservoir into heat transfer relationship with said first wall so as to cool said first wall and reduce the heat flux to said reservoir thereby reducing the boil-off rate of said cryogen.

References Cited
UNITED STATES PATENTS 2,756,027  7/1956  Hutchings _____ 165—169

WILLIAM J. WYE, Primary Examiner

U.S. Cl. X.R.

62—50

UNITED STATES PATENT OFFICE
CERTIFICATE OF CORRECTION

Patent No. 3,609,985          Dated October 5, 1971

Inventor(s) James R. De Haan

It is certified that error appears in the above-identified patent and that said Letters Patent are hereby corrected as shown below:

The spelling of the inventor's name is changed from "Dehaan" to -- De Haan --; and The "References Cited" at column 6 should include --

| | | | |
|---|---|---|---|
| 2,703,377 | 5/1955 | Morrison | 62-50 |
| 3,103,108 | 9/1963 | Santeler | 62-55.5 |
| 3,144,756 | 8/1964 | Arnold | 62-55.5 |
| 3,252,291 | 5/1966 | Eder | 62-55.5 |
| 3,296,810 | 1/1967 | Hablanian | 62-55.5 |
| 3,390,536 | 7/1968 | Kreisman | 62-55.5 |

Signed and sealed this 4th day of April 1972.

(SEAL)
Attest:

EDWARD M. FLETCHER, JR.          ROBERT GOTTSCHALK
Attesting Officer                     Commissioner of Patents